United States Patent Office 3,337,475
Patented Aug. 22, 1967

3,337,475
METHOD FOR THE POLYMERIZATION OF OLEFIN OXIDES
Kenichi Fukui, Sachio Yuasa, Tsutomu Kagiya, and Takeo Shimizu, Kyoto, and Takezo Sano, Osaka, Japan, assignors to Sumitomo Chemical Company, Ltd., Osaka, Japan, a corporation of Japan
No Drawing. Filed Dec. 27, 1962, Ser. No. 247,519
Claims priority, application Japan, Dec. 29, 1961, 36/48,286
1 Claim. (Cl. 260—2)

This invention relates to a novel method for the polymerization of olefin oxides. More particularly, it relates to a method for producing high polymers of olefin oxides, using a catalyst mainly composed of an organo-magnesium compound, or a coordination complex or a reaction product of an organo-magnesium compound with a polar compound which contains O or N atom.

Concerning the catalysts employed for the polymerization of olefin oxides, Friedel-Crafts type compounds, such as boron trifluoride, tin tetrachloride and zinc chloride, as well as acids and alkalis, have heretofore been known. Recently, alkali-earth metal carbonates, metal alkoxides, and alkylmetal compounds have further been reported.

However, few of them could yield high polymer of olefin oxides having predominant properties. Moreover, their preparations need complex procedures and their handlings are oftentimes difficult. Among them, merely alkali-earth metal carbonate catalysts could produce high polymers of ethylene oxide having intrinsic viscosity of higher than 5 in high yield with favorable reproducibility. But, these catalysts are difficult to prepare, because the activity is markedly affected by the content of moisture and impurities. Furthermore, the production of the polymer by use of these catalysts needs a comparatively high temperature.

Recently, a process using a metal alkyl as catalyst has also been disclosed, but this could not yield high polymer having intrinsic viscosity of higher than 5 in high yield. For example, the specification of British Patent No. 785,229 mentions that a catalyst of the formula: MeRR$_x$', wherein Me is a metal selected from Groups II and III of the Periodic Table, R is a hydrogen radical, R$_x$' are members selected from hydrogen, the halogens, hydrocarbon radicals, alkoxy radicals and secondary amino radicals, and $x$ is the valency of the metal Me minus one, is effective for the polymerization of alkylene oxides. This patent further shows that the typical catalysts are organo-metallic compounds of aluminum, zinc, and magnesium, among which the organo-aluminum compounds are the most preferable. However, the examples of the patent shows that the polymerized product obtained by use of the catalyst when started from ethylene oxide is of intrinsic viscosity of at highest 2 or 3. Moreover, this catalyst by-produces dioxane, cyclic tetramer or other low polymers of the olefin oxide.

C. C. Price also reported a method using triisobutyl-aluminum as catalyst (see J. Polymer Science, vol. 34, pages 161–163), but this method could not yield the polymers of intrinsic viscosity higher than 5 with favorable reproducibility.

E. J. Vandenberg disclosed (Japanese patent publication No. 15797/1960) that a ternary catalyst system of AlR$_3$-water-chelating agent could yield a high polymer of ethylene oxide of intrinsic viscosity of higher than 10. As seen from the catalyst composition, the active species of this catalyst might be that containing Al-O-Al bond. In this method, the mixing ratio and conditions seriously affect the yield and molecular weight of the polymeric product. Accordingly, obtainment of a polymer having a desired molecular weight with favorable reproducibility is difficult.

Accordingly, one object of the invention is to provide a novel method for polymerizing olefin oxides by use of a catalyst which can be prepared by a simpler process than in the former cases. Another object is to provide such method by which an olefin oxide polymer having a comparatively high degree of polymerization, for example, the one having intrinsic viscosity of higher than 5, can be produced with favorable reproducibility. Other objects would be apparent as the description proceeds.

To accomplish these objects, there is provided, in the present invention, a method for producing high polymers of olefin oxides, which comprises contacting at least one olefin oxide with a catalyst mainly composed of at least one member selected from the group consisting of organo-magnesium compounds having the general formula, $$MgR_2$$

wherein R is a hydrocarbon radical, and the coordination complexes and the reaction products of said organo-magnesium compound with a polar compound having at least one of oxygen and nitrogen atoms.

The organo-magnesium compounds of the formula MgR$_2$ include dialkyl-, dicycloalkyl-, and diarylmagnesium. The typicals are dimethylmagnesium, diethylmagnesium, di-n-propylmagnesium, di-isopropylmagnesium, di-n-butylmagnesium, di-isobutylmagnesium, dicyclopropylmagnesium, diphenylmagnesium, and the like.

As mentioned above, British Patent No. 785,229 appears to involve the use of the MgR$_2$. However, its specification describes that the advantageous conditions for the production of high molecular weight polymer involve temperature at higher than 100° C., while the advantageous conditions for the production of low molecular weight polymer such as cyclic tetramer and dioxane involve temperature lower than 100° C. Since substantially all of the Mg-C bonds in the MgR$_2$ react with the epoxide of olefin oxide at a temperature higher than 100° C., the active species of the catalyst at such conditions is considered to be what contains Mg-O bond. On the contrary, the catalyst of the present invention is considered to be what contains at least partly Mg-C bond, since the optimum temperature for the production of high molecular weight polyolefins is below 100° C. It is considered that MgR$_2$  in the present invention is in a highly associated state.

For the production of high molecular weight polyolefin oxides, the method of the invention in which the organo-magnesium compound is used at the optimum conditions is far superior to the method in which an organo-aluminum compound is used. Thus, the active species of the present catalyst is markedly and essentially different from that of the organo-aluminum catalyst. The catalyst of AlR$_3$ by-produces much amount of cyclic low molecular weight polymers. It does not produce olefin polymers of intrinsic viscosity of higher than 5. Even when diethylmagnesium is used, oily polymer is by-produced if the polymerization conditions, for example, temperature, is unsuitable, as seen in Example 6 of the specification of British Patent No. 785,229. On the other hand, when the catalyst of the invention is used under the identified conditions, a polyolefin oxide of intrinsic viscosity higher than 10 is produced at high yield within a comparatively short period of time with no by-production of cyclic or linear low molecular weight polyolefin oxides. This fact is due to the essential difference in the polymerization mechanisms.

It has generally been known that cationic polymerization of olefin oxides using an acid catalyst such as BF$_3$ and SnCl$_4$ by-produces much amount of dioxane and other low molecular weight polyolefin oxides. Accordingly, it is suitable to consider that the catalyst used in British Patent No. 785,229 is a kind of active species of cationic polymerization that is to say, when a Grignard type catalyst, is used, it acts in the form of, for example, an alkoxymagnesium halide under the practical condition of the method of this patent. Similarly, when a dialkylmagnesium is used, it acts as a magnesium alkoxide. Namely, they act practically as a Lewis acid.

The fact that Lewis acid type of catalysts causes, cationic polymerization has been well known. In such polymerization, the reaction is of chain type. The molecular chain grows for a short period of time, but it is no more elongated after that time, because chain-termination and chain-transfer reaction occur. Oftentimes, this polymerization is accompanied with depolymerization, forming dioxane. Contrarily, the catalyst in the present invention is considered to be of active species of anionic successive polymerization. Due to the polymerization mechanism of this type of catalyst, the molecular weight of the polymer increases as time elapses, and the number of the polymer molecules does not change during the polymerization proceeds, as obvious from examples set forth below. Besides, cyclic low molecular weight polymers are not formed.

When the $MgR_2$ is used singly according to the invention, it should be carefully prepared. If any active species of cationic polymerization is present in the $MgR_2$, it acts to the once formed high polymer according to the anionic polymerization and cleaves the molecular chains. The contamination of the active species of cationic polymerization can be prevented if the catalyst preparation is carried out with full caution. The active species of cationic polymerization seems to be formed around a slight amount of impurities contaminated in the preparation of the $MgR_2$ catalyst. Such impurities may be magnesium halides, halogenated hydrocarbons, decomposition products of Grignard reagent, etc. The deleterious effects of these impurities are more significant when the temperature is higher than 100° C. One reason why British Patent No. 785,229 fails to obtain high molecular weight polymer having intrinsic viscosity of higher than 5 even using $MgR_2$ catalyst might be due to the lack of such caution. The present invention aims at the use of a catalyst which causes only anionic polymerization and forms high molecular weight polymer exclusively.

To prepare the $MgR_2$ catalyst exclusively composed of active species of anionic polymerization the following regards should be paid.

(1) The conventional process to prepare the $MgR_2$ is addition of dioxane to an ether solution of a Grignard reagent to remove magnesium halide therefrom. In this process, it is necessary that dioxane is used in a large excess and the reaction product is aged well under an efficient agitation. Then, the ether is evaporated from the solution, followed by removal of the excess dioxane and vaporizable impurities in vacuo. All procedures should be carried out in a nitrogen stream free from oxygen.

(2) The most favorable Grignard reagent used for the preparation of $MgR_2$ is RMgCl. In the separation of magnesium halide from the Grignard reagent with doxane, magnesium chloride is easiest to form the adduct, which is also easiest to be separated. Accordingly, the case where RMgCl, among Grignard reagents of various halides, is used under otherwise the same conditions, is the most advantageous for the production of high molecular weight polyolefin oxides.

(3) In a method to prepare $MgR_2$ via an organic mercury compound, $HgR_2$, the contamination of the halides can easily be prevented. But, the purification of the organo-mercury compound should be carried out carefully.

According to another and more favorable feature of the present invention, significant effects are obtained when the $MgR_2$ compound is added with a polar compound having at least one of oxygen and nitrogen atoms, which is known as one of Lewis bases. The polar compound can react with the active species of cationic polymerization formed from the impurities contaminated in a slight amount in the catalyst, and can decrease or remove the function of this species, thereby the by-production of any low molecular weight polymer and the cleavage of the molecular chain are prevented and the stability of the active species of anionic polymerization is increased, so that the exclusive formation of high molecular weight polymer is facilitated. Accordingly, in case where the polar compound is added, a catalyst having highly active species of anionic polymerization and favorable reproducibility is obtained, even if the $MgR_2$ is prepared with no specifically great care and troublesome procedures. The activity of the catalyst added with the polar compound is at least comparable to that of $MgR_2$ which is prepared with strict caution. Moreover, the addition of the polar compound serves in many cases for the secondary action of catalyst stabilization which possibilitates obtainment of a far more active catalyst.

When a polar compound having at least one of oxygen and nitrogen atoms is added to the $MgR_2$, a coordination complex or a reaction product is formed. The suitable polar compounds include various ethers, such as diethyl ether, dioxane, and the like, and various tertiary amines, such as pyridine, triethylamine, and the like. They form coordination complex such as ethyl etherate, dioxanate, pyridinate, and triethylaminate, respectively, with the $MgR_2$. They also include various alcohols, amines, aldehydes, ketones, organic acids, esters, and the like, which form coordination complex compounds or reaction products with the $MgR_2$. They also include various chelating agents having functional group such as hydroxyl, amino, ether, and carbonyl groups, which form partial coordination complex. Examples of the chelating agents are diethers, diamines, diketones, ketoacids, ketoesters (typically acetoacetate), ketoaldehyde, hydroxyketones, hydroxyacids, hydroxyesters, dicarboxylic acids and their esters, dialdehydes, alkoxyacids, ketoxims, dioxims, hydroxyamines (typically 8-hydroxyquinoline), aminoethers, amino acids, polyethers, polyamines, and the like.

In general, the amount of the polar compound to be added to the $MgR_2$ is desirably 0.01 to 1.5 mols per mol of the $MgR_2$ in case of the compound having functional group reactive with the $MgR_2$, and is desirably 0.01 to 10 mols per mol of the $MgR_2$ in case of the compound having functional group capable of coordinating with the $MgR_2$.

The active complex compound of the present catalyst seems to play its role in a complicated structure or form, and not in the form of simple $Mg(OR)_2$ or $MgR(OR)$. The structure may be mainly composed of highly associated $MgR_2$, which involves Mg—O— bond formed by partial reaction with the epoxide radical of olefin oxide, and which further involves the coordinated polar compound serving activation and stabilization.

The activity can be modified by further addition of a polar compound having an active hydrogen.

Because of the complex structure of the catalyst, a stereo-regular crystalline polymer having high isotacticity can be obtained when a monomer having an asymmetric carbon atom, such as propylene oxide and epichlorohydrin, is used.

Particularly notable are the coordination complex of the organo-magnesium compound with a polar compound having no active hydrogen, such as tertiary amines, pyridines, ethers, cyclic ethers, thioethers, and the like. They are extremely advantageous, since the coordination complexes can be isolated as stoichiometric adducts and can be easily handled in pure and stable state. Besides, such coordination complex is generally more stable than single $MgR_2$, has improved solubility to organic solvent, and has elevated catalytic activity.

The olefin oxides which can be polymerized according to the invention include ethylene oxide, propylene oxide, and other olefin oxides having a substituent, such as styrene oxide, epichlorohydrin, and the like. They may be employed singly or as a mixture thereof, to yield the homopolymers or copolymers.

The polymerization reaction may be effected either in the presence, or in the absence, of a solvent. The solvents may, if employed, be any of aliphatic, alicyclic, and aromatic hydrocarbons, and various ethers, which are inert to the present polymerization reaction. The properties of the polymer product can vary within the desired extent depending upon the kind and amount of solvent.

As mentioned above, the present polymerization is effected at a temperature below 100° C. The preferable temperature is −80° C. to +100° C., more particularly −30° C. to +80° C. When the monomer used is a lower compound, the polymerization is effected advantageously in a pressure vessel.

By polymerizing an olefin oxide according to the present catalyst, a high molecular weight polymer of any characteristic properties can be produced by selection of the kind of catalyst and the concentration of monomer, the kind of solvent, and the temperature and other conditions. For example, ethylene oxide produces polyethylene oxide having intrinsic viscosity of higher than 5 in high yield with favorable reproducibility. Thus, the comparatively low polymerization temperature and the high activity and stability of the catalyst are also remarkable features of the invention.

Purification of the polymer product is conducted, for example, as follows, although it may be arbitrarily modified according to the kind of monomer and the properties of the polymer. In case of polyethylene oxide the unreacted monomer and the solvent, if employed, are recovered from the reaction mixture. The polymer is dissolved in water containing a small amount of $NH_3$, and the resulting magnesium hydroxide is centrifuged. Removal of water from the polymer solution leaves the polymeric product. Or, the reaction mixture is dissolved in benzene containing a small amount of alcohol, and the solution is stood still overnight. The catalyst residue is centrifuged, and the solution is poured into ethyl ether, whereby the polymer product is isolated and precipitated. When the polymer is hardly soluble in water as in case of polypropylene oxide, it is dissolved in an organic solvent immiscible with water, and the solution is extracted with a dilute hydrochloric acid to remove the catalyst residue. Removal of the organic solvent from the solution, or addition of a non-solvent to the solution gives the polymer produced.

The polyolefin oxides produced according to the present invention have higher intrinsic viscosity, such as 5 to 17 or higher. Such polyolefin oxides can be formed in a stretchable film or fiber, or other shaped articles. For example, the polyethylene oxide thus produced, which has intrinsic viscosity higher than 5 can be used as binders, water soluble tough films, adhesives, thermoplastic resins, and agents for sizing and thickening.

The present invention will be more fully described with reference to the following examples, which are, however, set forth merely by way of illustration and not by way of limitation.

*Examples 1 to 28*

Dialkylmagnesiums and diarylmagnesiums used in these examples are synthesized by the following method, in which all procedures are carried out in a nitrogen stream. An alkyl or aryl chloride and magnesium foil are reacted together in diethyl ether to prepare a diethyl ether solution of the alkylmagnesium chloride or arylmagnesium chloride. Upon addition of 5 times equivalent amount of anhydrous dioxane to the solution while being cooled, magnesium chloride dioxanate is precipitated. After removal of the precipitate by centrifuge or filtration, the ether solution is concentrated. The residue is further heated in vacuo at 80° to 100° C. to remove the coordinated dioxane and the unreacted materials. The remaining residue is white mass or powder of dialkyl- or diarylmagnesium. This procedure should be carried out with strict caution. The obtained compound is well crushed and powdered, and used as catalyst.

The polymerization is effected in a thick hard glass ampoule of 10 cc. inner volume. The catalyst prepared as mentioned above is weighed in the ampoule under a nitrogen stream, and then a preliminarily purified and rectified ethylene oxide monomer is fed into the ampoule, which is then sealed. The ampoule is put into a constant temperature bath at 35° C., and allowed to stand still for a definite time. In these examples, the reaction time is changed to know the process of the reaction. After the definite time, the reaction product is

TABLE 1

| Example No. | Catalyst | | Monomer charged (g.) | Polymerization time (hr.) | Polymer product | |
|---|---|---|---|---|---|---|
| | Kind | Weight (g.) | | | Yield (percent) | Intrinsic viscosity |
| 1 | $Mg(CH_3)_2$ | 0.12 | 5.8 | 1 | 1.6 | 1.20 |
| 2 | $Mg(CH_3)_2$ | 0.12 | 5.8 | 3 | 4.7 | 5.2 |
| 3 | $Mg(CH_3)_2$ | 0.12 | 5.8 | 5.5 | 8.3 | 7.9 |
| 4 | $Mg(CH_3)_2$ | 0.12 | 5.8 | 8 | 12.2 | 10.8 |
| 5 | $Mg(C_2H_5)_2$ | 0.11 | 3.5 | 1 | 4.5 | 4.1 |
| 6 | $Mg(C_2H_5)_2$ | 0.11 | 3.5 | 3 | 7.9 | 8.2 |
| 7 | $Mg(C_2H_5)_2$ | 0.11 | 3.5 | 5.5 | 16.1 | 11.5 |
| 8 | $Mg(C_2H_5)_2$ | 0.11 | 3.5 | 8 | 25.8 | 16.3 |
| 9 | $Mg(n-C_3H_7)_2$ | 0.11 | 2.6 | 1 | 5.1 | 0.8 |
| 10 | $Mg(n-C_3H_7)_2$ | 0.11 | 2.6 | 3 | 6.9 | 2.1 |
| 11 | $Mg(n-C_3H_7)_2$ | 0.11 | 2.6 | 5.5 | 13.8 | 4.6 |
| 12 | $Mg(n-C_3H_7)_2$ | 0.11 | 2.6 | 8 | 25.4 | 5.5 |
| 13 | $Mg(i-C_3H_7)_2$ | 0.11 | 2.6 | 1 | 5.2 | 1.2 |
| 14 | $Mg(i-C_3H_7)_2$ | 0.11 | 2.6 | 3 | 11.0 | 2.4 |
| 15 | $Mg(i-C_3H_7)_2$ | 0.11 | 2.6 | 5.5 | 18.7 | 3.7 |
| 16 | $Mg(i-C_3H_7)_2$ | 0.11 | 2.6 | 8 | 37.0 | 9.0 |
| 17 | $Mg(n-C_4H_9)_2$ | 0.15 | 2.9 | 1 | 4.0 | 0.7 |
| 18 | $Mg(n-C_4H_9)_2$ | 0.15 | 2.9 | 3 | 10.5 | 2.7 |
| 19 | $Mg(n-C_4H_9)_2$ | 0.15 | 2.9 | 5.5 | 17.4 | 13.0 |
| 20 | $Mg(n-C_4H_9)_2$ | 0.15 | 2.9 | 8 | 27.6 | 13.8 |
| 21 | $Mg(i-C_4H_9)_2$ | 0.15 | 2.9 | 1 | 4.9 | 0.5 |
| 22 | $Mg(i-C_4H_9)_2$ | 0.15 | 2.9 | 3 | 10.3 | 0.8 |
| 23 | $Mg(i-C_4H_9)_2$ | 0.15 | 2.9 | 5.5 | 19.8 | 0.8 |
| 24 | $Mg(i-C_4H_9)_2$ | 0.15 | 2.9 | 8 | 26.2 | 0.7 |
| 25 | $Mg(C_6H_5)_2$ | 0.17 | 2.5 | 1 | 3.6 | 0.6 |
| 26 | $Mg(C_6H_5)_2$ | 0.17 | 2.5 | 3 | 8.6 | 2.7 |
| 27 | $Mg(C_6H_5)_2$ | 0.17 | 2.5 | 5.5 | 12.8 | 2.2 |
| 28 | $Mg(C_6H_5)_2$ | 0.17 | 2.5 | 8 | 15.7 | 1.3 | taken out of the ampoule. After evaporation of the unreacted monomer, the product is dissolved into benzene, and the resulting solution is poured into ethyl ether, whereby a solid polymer being isolated. Intrinsic viscosity of the solid polymer is determined in an aqueous solution at 35° C. by use of Ubellohde's viscometer. The results are summarized in Table 1.

Although the results vary considerably depending upon the kind of the organic radical of the catalyst, the yields and the intrinsic viscosities generally increase with increase of the polymerization time. This shows that the polymerization reaction is of successive polymerization type due to the active species of anionic polymerization. In diisobutyl- and diphenylmagnesium catalysts, the intrinsic viscosities do not increase in proportion to the polymerization time, but the case is different when a polar compound is added.

Examples 29 to 31

Following Table 2 sets forth the results of polymerizations using coordination complexes of diethylmagnesium with diethyl ether and with cyclic ethers. These coordination complexes are prepared by reacting diethyl mercury with magnesium foils in the respective complexing agent as solvent, and separating the solution portion, which is carefully concentrated in vacuo at a low temperature. The complex with diethyl ether is unstable at room temperature and is used under cooling at below −10° C. The complexes with dioxane and with tetrahydrofuran are crystalline or semi-solid at room temperature. The complex with dioxane is especially stable.

not deleteriously affect the polymerization but rather improve the yield and intrinsic viscosity.

Example 39

Into the ampoule as described in Examples 1 to 28, 0.04 g. of diethylmagnesium and then 0.06 g. of ethyl acetoacetate are charged under cooling at −20° C. Further, 2.0 g. of ethylene oxide is charged, and the ampoule is sealed. The polymerization is allowed to proceed by standing the ampoule still at 10° C. for 24 hours. The similar procedure as in the preceding examples results in 1.45 g. of a white solid polymer having intrinsic viscosity of 9.4.

Example 40

Into the similar ampoule, 0.04 g. of diethylmagnesium and then 0.67 g. of 8-hydroxyquinoline are charged under cooling at −20° C., whereby a yellow reaction product being formed in a little amount. Further, 2.0 g. of ethylene oxide is charged therein, and the ampoule is sealed. The polymerization is allowed to proceed by standing still at 10° C. for 24 hours. The similar procedure as in the preceding examples results in 1.38 g. of a white solid polymer having intrinsic viscosity of 11.1.

Example 41

To 3 cc. of an ethyl ether solution containing 0.05 g. of diethylmagnesium, 0.05 g. of diethylamine is added under cooling. After a while, 2.0 g. of ethylene oxide is added thereinto, and the glass ampoule is sealed.

The polymerization is allowed to proceed by standing the ampoule still at 35° C. for 10 hours. The similar pro-

TABLE 2

| Ex. No. | Catalyst | Monomer charged (g.) | Reaction time (hr.) | Polymer Yield (percent) | Polymer Intrinsic viscosity |
|---|---|---|---|---|---|
| 29 | MgEt₂-diethylether | 1.6 | 7 | 20.6 | 11.3 |
| 30 | MgEt₂-2 dioxane | 1.7 | 7 | 33.5 | 10.9 |
| 31 | MgEt₂-2 tetrahydrofuran | 1.8 | 1 | 8.3 | 6.5 |

The amount of the catalyst is 0.1 g. and the other conditions are the same as in Examples 1 to 28. As seen from Table 2, the activities of the catalysts are higher than in the case where single MgEt₂ is used.

Examples 32 to 38

The catalyst in these examples is diethylmagnesium added with triethylamine. The procedures are the same as in the preceding examples. The results obtained in the polymerizations, in which the amount of triethylamine added to 0.1 g. of diethylmagnesium and reaction temperature are changed, are set forth in Table 3.

cedure as in the preceding examples results in 1.21 g. of a whilte solid polyethylene oxide, which has intrinsic viscosity of 8.3.

Examples 42 to 46

Into a glass ampoule as in Examples 1 to 28, which has been flashed well with nitrogen, 0.15 g. of an organomagnesium compound as described below is placed. Then, a described amount of propylene oxide is charged, and the glass ampoule is sealed. The polymerization is allowed to proceed by placing the ampoule in a constant temperature bath. The reaction mixture is dissolved in

TABLE III

| Ex. No. | Triethylamine added (g.) | Mol ratio of N/Mg. | Monomer charged (g.) | Reaction temp. (° C.) | Reaction time (hr.) | Polymer Yield (percent) | Polymer Intrinsic viscosity |
|---|---|---|---|---|---|---|---|
| 32 | 0.05 | 0.41 | 2.6 | 35 | 20 | 1.8 | 8.1 |
| 33 | 0.1 | 0.82 | 2.6 | 35 | 20 | 2.3 | 13.8 |
| 34 | 1.0 | 8.2 | 2.6 | 35 | 20 | 2.9 | 15.8 |
| 35 | 0 | 0 | 4.0 | 75 | 1 | 0.7 | 8.7 |
| 36 | 0.08 | 0.65 | 4.0 | 75 | 1 | 1.8 | 9.4 |
| 37 | 0.13 | 1.06 | 4.0 | 75 | 1 | 1.7 | 12.7 |
| 38 | 0.46 | 3.75 | 4.0 | 75 | 1 | 1.4 | 12.3 |

Example No. 35 shows the case where no triethylamine is added. The results in Examples No. 36 through 38 show significant accelerating effect of triethylamine. Also the molecular weight of the polymer product is increased. Example 34 shows the case in which a large amount of the amine is used as shown in the value of N/Mg ratio 8.2. The large amount of the amine does benzene, and the solution is treated with a dilute hydrochloric acid to remove the catalyst residue. The benzene solution is once washed with water, and then dried over anhydrous potassium carbonate. Upon evaporation of benzene, a polymer is obtained as the residue. The polymeric product is once dissolved in hot acetone, and the solution is cooled at −30° C., to separate the cold acetone-insoluble part from the cold acetone-soluble part. The intrinsic viscosities of both parts are determined with benzene solvent at 35° C. The results are set forth in Table 4.

TABLE 4

| Example No. | Catalyst | Monomer charged (g.) | Reaction temp. (° C.) | Reaction time (days) | Polymer yield (g.) | Cold acetone-insol. part | | Cold acetone-sol. part intrinsic viscosity |
|---|---|---|---|---|---|---|---|---|
| | | | | | | Percent | Intrinsic viscosity | |
| 42 | Mg(C$_2$H$_5$)$_2$ | 3.9 | 35 | 2 | 1.1 | 36 | 11.0 | 0.96 |
| 43 | Mg(C$_2$H$_5$)$_2$-2 dioxane | 4.1 | 0 | 5 | 0.15 | 49 | 9.1 | 1.36 |
| 44 | Mg(C$_2$H$_5$)$_2$ | 4.4 | 18 | 14 | 2.3 | 43 | 17.5 | 1.19 |
| 45 | Mg(i-C$_3$H$_7$)$_2$ | 4.4 | 18 | 14 | 2.5 | 30 | 6.1 | 0.53 |
| 46 | Mg(n-C$_4$H$_9$)$_2$ | 4.4 | 18 | 14 | 1.8 | 33 | 7.2 | 0.88 |

The results of X-ray diffraction examination show that the cold acetone-insoluble part of the polymer is crystalline. The infrared spectrum of the cold acetone-insoluble part exhibits significant absorption bands due to the crystalinity. Accordingly, the polymeric product of this example is proved to have a stereo-regularity. The cold acetone-soluble part is almost amorphous, but its large intrinsic viscosity is notable.

Example 47

To 1 cc. of ethyl ether solution containing 0.1 g. of diethylmagnesium, 0.04 g. of pyridine is added under cooling. Into the mixture, 4.4 g. of propylene oxide is charged, and the mixture is stood still at 35° C. After two days, the reaction mixture is treated as in Examples 42 to 46. Solid polymer obtained weighs 1.84 g., which has intrinsic viscosity of 9.8. The cold-acetone insoluble part accounts for 37% of the total amount, which is highly crystalline.

Example 48

According to the general procedure as described in the preceding examples, ethylene oxide and propylene oxide are copolymerized. An ampoule containing 1 cc. of an ethyl ether solution having 0.1 g. diethylmagnesisum, 2.2 g. of ethylene oxide and 2.9 g. of propylene oxide, is rotated in a constant temperature bath, at 35° C. After 48 hours, the reaction mixture is taken out, and the unreacted monomer and ethyl ether are distilled off in vacuo. The residue is dissolved in chloroform, and the solution is washed with a dilute hydrochloric acid under cooling to remove the catalyst residue, and further washed with water. Chloroform is distilled off from the chloroform solution, and the residue is dried in vacuo, leaving a rubber-like amorphous polymer, which weighs 1.72 g.

Example 49

Using 0.1 g. of diethylmagnesium prepared as in Examples 5 to 8 as catalyst, 4.6 g. of epichlorohydrin is bulk-polymerized at 15° C. After 24 hours, the reaction mixture is dissolved in 20 cc. of benzene, and the solution is washed with 10% hydrochloric acid to remove the catalyst residue. Benzene is dried off from the solution, leaving 1.3 g. of a polymer, which is then treated with acetone at room temperature to separate the soluble part. The acetone-insoluble part accounts for 28% of the total polymer, and is a non-tacky solid melting at 115° C. The results of X-ray diffraction examination shows that it is crystalline. The acetone-soluble part is a tacky semi-solid.

Example 50

Using 0.1 cc. of an ethyl ether solution containing 0.1 g. of diethylmagnesium prepared as in Examples 5 to 8, 2.4 g. of styrene oxide is polymerized at 5° C. After 36 hours, a yellow viscous liquid is obtained. The product is dissolved in 20 cc. of benzene, and the solution is washed with 10% hydrochloric acid to remove the catalyst residue. The solution is dried over anhydrous potassium carbonate, and the benzene is dried off at 80° C./10 mm. Hg for 10 hours, leaving 1.4 g. of greasy polymer, which has intrinsic viscosity of 0.17 (in benzene solution at 35° C.).

What we claim is:

A method for producing high polymers selected from the group consisting of homopolymers of ethylene oxide, propylene oxide, styrene oxide and epichlorohydrin and copolymers of the same, which comprises contacting at least one olefin oxide selected from the group consisting of ethylene oxide, propylene oxide, styrene oxide and epichlorohydrin, at a temperature between −30° C. and 80° C. with a catalyst composed of an isolated stoichiometrically-coordinated complex of (A) an organomagnesium compound having the formula MgR$_2$ wherein R is alkyl having 1 to 4 carbon atoms or phenyl, with (B) a polar compound which is an ether or a tertiary amine having no active hydrogen, said catalyst having been prepared by (i) exchange reaction between (C) an organo-mercury compound having the formula HgR$_2$ wherein R is as defined above and (D) magnesium in the presence of said polar compound, and (ii) isolation of the resulting complex.

References Cited

UNITED STATES PATENTS

| 3,127,371 | 3/1964 | Garty et al. | 260—2 |
| 3,135,706 | 6/1964 | Vandenberg | 260—2 |
| 3,141,815 | 7/1964 | Manley | 260—2 |

FOREIGN PATENTS

| 793,065 | 4/1958 | Great Britain. |
| 870,418 | 6/1961 | Great Britain. |

OTHER REFERENCES

Osgan et al.: Journal Polymer Science, 34, 153–156 (1959).

SAMUEL H. BLECH, *Primary Examiner.*

WILLIAM H. SHORT, *Examiner.*

S. N. RICE, T. D. KERWIN, *Assistant Examiners.*